Oct. 16, 1962

H. M. ZENOR 3,059,119

PHOTOELECTRIC APPARATUS

Filed June 22, 1961

INVENTOR.
HUGHES M. ZENOR

BY
Adams, Forward & McLean
ATTORNEYS

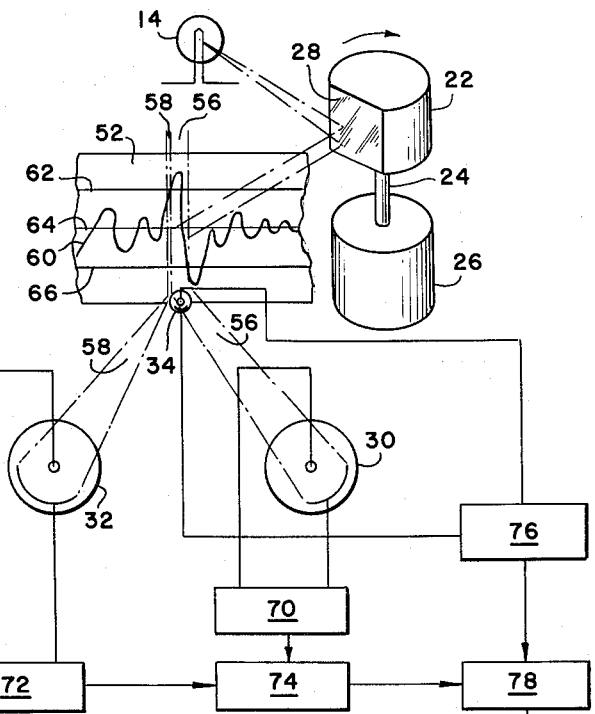
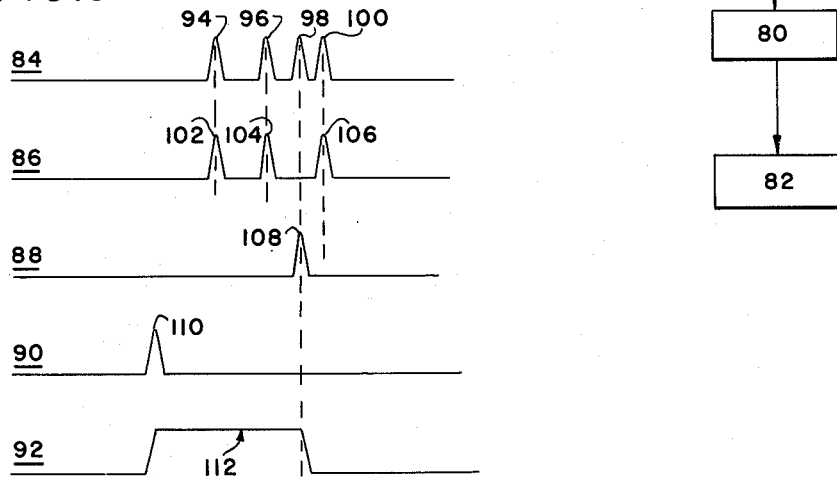

United States Patent Office 3,059,119
Patented Oct. 16, 1962

3,059,119
PHOTOELECTRIC APPARATUS
Hughes M. Zenor, Rolla, Mo., assignor to Sinclair Oil
& Gas Company, Tulsa, Okla., a corporation of Maine
Filed June 22, 1961, Ser. No. 118,972
5 Claims. (Cl. 250—219)

My invention relates to a photo-sensitive device for reproducing visual records. More particularly, my invention relates to a photoelectric device for reproducing a visual record as an electrical signal.

The use of a photoelectric device for the reproduction of visual records has been described in the application of Johnson, Serial Number 676,016, filed August 2, 1957. Such device operates by generating a signal each time a beam of light transversely scanning a recorded trace intercepts an opaque line on the visual record. In many operations, such as well-logging, a trace is recorded on a surface having pre-printed scale lines paralleling the direction in which the trace is recorded. For the initial evaluation of such traces, the presence of a scale is both necessary and desirable, however, subsequent processing of such visual records, in many instances, requires the elimination of the scale. Inasmuch as the Johnson device is sensitive to all the markings on the visual record, it does not distinguish between the scale lines and the trace line and, therefore, will not reproduce the visual record with the simultaneous elimination of the scale lines.

It is thus an important object of my invention to provide an apparatus for reproducing graphical records while simultaneously eliminating scale lines thereon and which if desired can be used in conjunction with the device of the above noted Johnson application for the purposes disclosed in such application.

Briefly, the apparatus of my invention includes a device for moving a line of light across a surface on which is placed the visual record to be reproduced. The direction of movement of the line of light extends transversely relative to the base line of the visual record, while the longitudinal dimension of the line of light extends generally in the direction of the base line of the visual record to be reproduced. It will be observed, therefore, that the longitudinal dimension of the line of light extends transversely to the direction of the movement of the line of light causing the line of light on each movement not only to follow in a path extending transversely across the record to be reproduced but also having a significant dimension along the length of the record. As in the case of the application of Johnson, S.N. 676,016, some arrangement is provided for moving the record along the surface on which it is placed lengthwise in the direction of the base line of the record, such that each repetition of the movement of the line of light follows a path across the record incrementally displaced from the previous path in the direction of the base line of the record. It will be evident that a variety of devices can be employed for so moving a line of light across the surface. These would include a cathode ray oscilloscope, in which case the record should preferably be transluscent, and optical systems provided with rotating mirrors. (In each case, of course, in order to provide a continuous operation the line of light will be repetitively moved.)

Two light sensitive devices, such as photo-multipliers, are arranged with a suitable optical system to respond to variations in intensity of light along the path of movement of the line of light. Each such device is provided with a field of vision extending in the direction of the path of movement of the line of light. In one case, the field of vision of one light sensitive device is limited essentially to a line extending in the direction of the path of movement of the line of light and having a negligible dimension along the line of light such that at any instant the light sensitive device responds only to a point of light on the surface of the record. In the other case, the light sensitive device has a field of vision having a significant dimension along the length of the line of light. Accordingly, as the line of light is cast across the surface of the record to be reproduced the light sensitive device having the limited field of vision will have an output varying in intensity each time the line of light crosses any lines marked on the record to be reproduced, since only a substantially dimensionless point of light lies in its field of vision. In the case of the second light sensitive device, however, significant variations in its output occur only when the line of light substantially coincides with a scale or other reference line on the record to be reproduced. Such lines obviously would extend only in the direction of the base line of the record and ordinarily would not be the marking on the visual record representing the fluctuating signal to be reproduced. Accordingly, elimination of response in the output of the first light sensitive device to its crossing a scale line or the like is accomplished by nullifying such variation in its output circuit when a variation in the output circuit of the second light sensitive device occurs. Typically this is accomplished by controlling a gate with the output circuits of the two light sensitive devices to open the gate only when there is a response in the output circuit of the first light sensitive device and not a response in the output circuit of the second light sensitive device. Thus, for example, the first light sensitive device can be arranged to control subsequent circuits as in the apparatus for the aforementioned Johnson application to indicate the passage of the line of light across the markings on the visual record corresponding to the signal to be reproduced. The connection between the output circuit of the first light sensitive device to the subsequent equipment can be made through a normally open gate which is controlled by the output circuit of the second light sensitive device such that it is closed upon a response in the output circuit of the second light sensitive device to a substantial change in intensity of light in its field of vision.

For a more complete understanding of my invention reference is made to the attached drawings in which an embodiment of my invention is illustrated.

FIGURE 4 is a schematic diagram of the embodiment shown in FIGURES 1, 2 and 3, together with one type of electric circuit that can be employed.

FIGURE 5 is a representation of the output signals of the various components of the electric circuit shown in FIG. 4.

FIGURES 1, 2 and 3 show a light proof container 10 for enclosing the major elements of the apparatus. A second light proof container 12, enclosing a light source 14 with a reflector 16, is interconnected with container 10 by means of a narrow rectangular slot 18 in the wall 20 of container 10 on which container 12 is mounted. Within container 10 is located a drum 22 rotatably mounted on a shaft 24 driven by a motor 26. Affixed to drum 22 is a plane mirror 28 disposed parallel to the axis of rotation of drum 22. Slot 18 is disposed with its longitudinal dimension parallel to the axis of rotation of drum 22 such that light originating at light source 14 passes through slot 18 and is incident upon drum 22.

Figure 1:
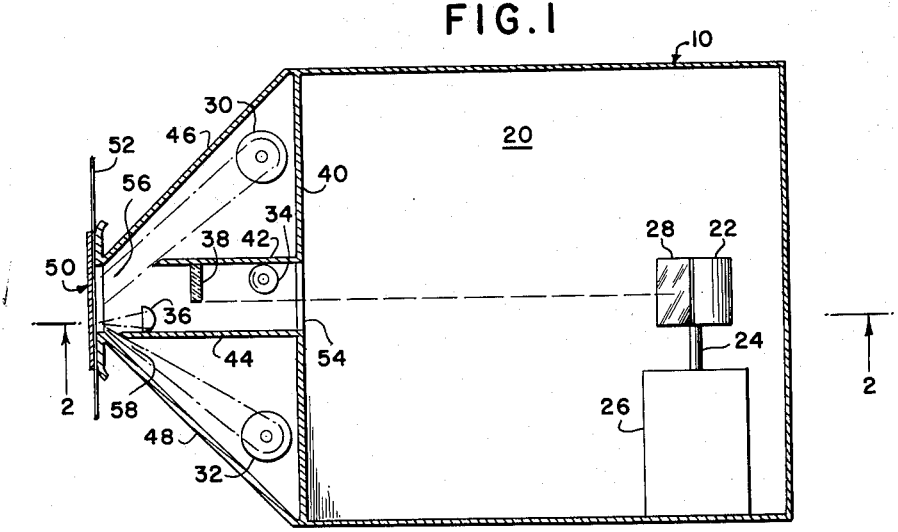
FIGURE 1 is a plan view of an apparatus embodying my invention.

The drum 22 is located at one end of light proof container 10, while photoelectric cells 30, 32 and 34, a converging lens 36, a glass plate 38, and partitions 40, 42 and 44 are located at the opposite end of container 10. As shown in FIGURE 1, the side walls 46 and 48 of container 10 on each side of wall 20 converge but do not close at the end of container 10 opposite drum 22 thus providing a rectangular opening in such end of container 10. Associated with the converging ends of walls 46 and 48 is a plate 50 adjacent such opening providing a supporting surface for maintaining a visual record 52 across such opening included between the converging ends of walls 46 and 48 substantially flat and disposed in a plane parallel to the axis of rotation of drum 22. Thus, it can be seen that light originating at light source 14 will pass through slot 18 and will be reflected by mirror 28 towards the converging ends of walls 46 and 48 onto the surface of visual record 52.

As shown in the drawings, particularly FIGURE 1, partition 40 is located within container 10 and disposed transverse to the direction in which the light travels from mirror 28 to visual record 52. The partition 40 extends across container 10 and is positioned at the place where side walls 46 and 48 begin to converge. The partition 40 is also provided with a central rectangular opening 54 so as to permit the passage of light from mirror 28 to visual record 52. The width of opening 54 is approximately the same as the longitudinal dimension of slot 18 while the longitudinal dimension of opening 54 is of sufficient magnitude so as to allow the light reflected from mirror 28 as drum 22 rotates to be incident upon substantially the entire surface of visual record 52 included in the opening between walls 46 and 48. (See FIGURE 2.)

Partitions 42 and 44 are disposed substantially parallel to each other and spaced apart a distance approximately equal to the width of opening 54. Partitions 42 and 44 are positioned substantially perpendicular to partition 40 and extend across container 10 from partition 40 in the direction away from the location of drum 22. The partitions 42 and 44 are located along the opposite longitudinal edges of opening 54 thereby defining a passageway between opening 54 and visual record 52 for the light reflected by mirror 28. It will be noticed in FIGURE 1 that although neither partition 42 nor partition 44 extends a sufficient distance from partition 40 to contact either side walls 46 or 48, respectively, or to contact visual record 52, the terminal end of partition 42 is substantially more remote from visual record 52 than is the terminal end of partition 44.

Photocell 30 is positioned in container 10 between partitions 40 and 42 and side wall 46, while photocell 32 is similarly situated between partitions 40 and 44 and side wall 48. Thus, it can be seen that the two photoelectric cells 30 and 32 are positioned such that photoelectric cells 30 and 32 are shielded from all light except that which is reflected from visual record 52. Photoelectric cell 34 is positioned between partitions 42 and 44 such that the first light reflected from mirror 28 through opening 54 as drum 22 rotates is incident upon photoelectric cell 34. Photoelectric cells 30 and 32, partitions 42 and 44, and side walls 46 and 48 are also positioned in relation to each other so that the field of vision 58 of photoelectric cell 32 is substantially more narrow than and immediately adjacent to the field of vision 56 of photoelectric cell 30.

The outputs of photoelectric cells 30, 32 and 34 are connected to the electrical circuitry of this device as will be explained more fully below.

As can also be seen, particularly in FIGURE 1, a converging semi-cylindrical lens 36 is attached to partition 44 and extends into the passageway between partitions 42 and 44. A rectangular glass plate 38 is attached to partition 42 and also extends into the passageway between partitions 42 and 44. The glass plate 38 is of such dimension that it extends across a major portion of the distance between partitions 42 and 44. The lens 36 extends across the remaining minor portion of the distance between partitions 42 and 44.

The purpose and function of lens 36 and glass plate 38 will be explained more fully below.

Figure 2:
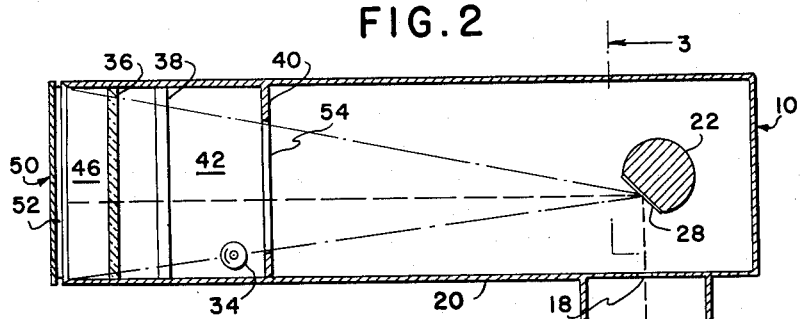
FIGURE 2 is a sectional view taken along the line 2—2 of FIGURE 1.
Figure 3:
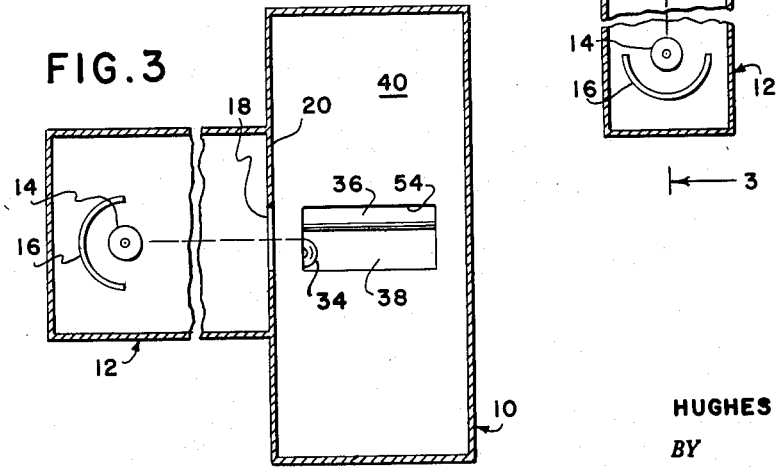
FIGURE 3 is a sectional view taken along the line 3—3 of FIGURE 2.

FIGURE 4 is a schematic representation of the apparatus shown in FIGURES 1, 2 and 3, including light source 14, drum 22, shaft 24, motor 26, plane mirror 28, photoelectric cells 30, 32 and 34, and visual record 52, together with one type of electrical circuit that can be employed with such embodiment. Shown on visual record 52 are trace line 60 and horizontal scale lines 62, 64 and 66.

As explained above, the light from light source 14 is reflected by mirror 28 onto visual record 52 and photoelectric cells 30 and 32 are sensitive only to light reflected from visual record 52. As can also be seen in FIGURE 4, the field of vision 58 of photoelectric cell 32 is substantially more narrow than the field of vision 56 of photoelectric cell 30.

The photoelectric cells 30 and 32 are connected to output circuits 70 and 72, respectively. A gate circuit 74 is connected to pass the signal from output circuit 72. The signal from output circuit 70 is connected as an input signal to the control circuit of gate circuit 74 so as to close the gate circuit 74 upon a change in output signal from output circuit 70. Thus, the output signal from gate circuit 74 is responsive to a difference in the output signals of output circuits 70 and 72.

It can also be seen in FIGURE 4 that photoelectric cell 34 is connected to output circuit 76. As mentioned above, only the first light reflected by mirror 28 through opening 54 in any given rotation of drum 22 will be incident upon photoelectric cell 34. Thus, the signal from output circuit 76 is responsive to the initial passage of light through opening 54.

The output signals from gate circuit 74 and output circuit 76 are connected as input signals to a bi-stable multivibrator 78. The output from multivibrator 78 is connected as an input to an integrating circuit 80. The output from integrating circuit 80 is in turn connected as an input to a differentiating circuit 82.

In operation the light from light source 14 passing through slot 18 is reflected from the mirror 28 affixed to drum 22 onto the visual record 52 in the form of a "line" of light having its longitudinal dimension parallel to the axis of drum 22. Motor 26 rotates shaft 24 which in turn rotates drum 22 thereby moving the "line" of light across visual record 52 transversely to the longitudinal dimension of the "line" of light. The fields of vision 56 and 58 of photoelectric cells 30 and 32, respectively, are restricted by partitions 42 and 44, and walls 46 and 48 to a path intercepting the "line" of light and extending across the visual record 52 in the direction of movement of the "line" of light. As the "line" of light crosses the horizontal scale lines 62, 64 and 66 and the trace line 60 there is a decrease in the amount of light reflected from visual record 52. Thus, due to the comparatively narrow field of vision 58 of photoelectric cell 32, the output of photoelectric cell 32 is substantially decreased each time the "line" of light crosses one of the horizontal scale lines 62, 64 and 66 and the trace line 60. However, due to the comparatively wide field of vision 56 of photoelectric cell 30, the output of photoelectric cell 30 is substantially decreased only when the "line" of light crosses one of the horizontal scale lines 62, 64 and 66.

Subsequent to each scan by the "line" of light, visual record 52 can be incrementally displaced in the direction of the longitudinal dimension of the "line" of light by means not shown. More preferably, however, record 52 is constantly moving in such direction at a rate which is relatively slow in relation to the speed of scanning with the "line" of light such that each fluctuation of trace 60 is scanned a number of times.

In FIGURE 5 are shown graphical representations of the output signals from output circuit 72, output circuit 70, gate circuit 74, output circuit 76 and bi-stable multivibrator 78, indicated by reference numbers 84, 86, 88, 90 and 92, respectively. In output signal 84, the peaks 94, 96 and 100 are the result of the "line" of light crossing scale lines 66, 64 and 62, respectively. Peak 98 is the result of the "line" of light crossing the trace line 60. In output signal 86, the peaks 102, 104, and 106 are the result of the "line" of light crossing scale lines 66, 64 and 62, respectively. Thus, while signal 84 is passed by gate circuit 74, signal 86 closes gate circuit 74 when peaks 102, 104 and 106 are received, thereby blocking peaks 94, 96 and 100 from being passed. The output signal 88 of gate circuit 74 therefore includes only peak 108, corresponding to peak 98.

Referring again to FIGURE 4, it can be seen that as mirror 28 affixed to drum 22 rotates into position to reflect the light from light source 14 onto the visual record 52, the light is also incident upon photoelectric cell 34 the moment that each scan is commenced, thereby causing a pulse in the output circuit 76. Multivibrator 78 has the output signals of output circuit 76 and gate circuit 74 connected as input signals thereto. Thus, the output signal of output circuit 76 functions as a first trigger signal and the output signal of gate circuit 74 functions as a second trigger signal for multivibrator 78. The output signal of multivibrator 78 is, therefore, a time function of the distance from an imaginary datum line on visual record 52 to a point on trace line 60.

For a more complete understanding of this operation, reference is again made to FIGURE 5 wherein reference number 90 indicates a graphical representation of the output signal from output circuit 76 and reference number 92 indicates a graphical representation of the output signal from multivibrator 78. The peak 110 in output signal 90 indicates the instant of time that the "line" of light starts to move across visual record 52. The peak 110 triggers multivibrator 78 to start the pulse 112 of output signal 92. The peak 108 of output signal 88 triggers multivibrator 78 to end the pulse 112 of output signal 94. Thus, the time length of pulse 112 is a function of the distance from the point where the "line" of light starts its scan of visual record 52 to the point within the field of vision 58 where the "line" of light crosses the trace line 60.

The output signal from multivibrator 78 is then connected as an input to integrating circuit 80 whose output is in turn connected as an input to differentiating circuit 82. The original trace line 60 is thereby reproduced and the horizontal scale lines 62, 64 and 66 are eliminated.

While the apparatus of FIGURES 1 to 3 will operate effectively and accurately without the presence of the lens 36 and glass plate 38, at times a more discriminating output is desired and in such instances I have found that partition 44 and wall 48 do not sufficiently restrict the field of vision 58 of photoelectric cell 32 to produce a sufficiently sharp signal. To compensate for this fact, lens 36 is attached to partition 44 and positioned across one end of the path of the "line" of light reflected from mirror 28 onto the visual record 52. Thus, that portion of the "line" of light normally falling within the field of vision 58 is now focused by lens 36 into a point of light on the surface of visual record 52. While this expedient solved one problem it created another, namely, that portion of the "line" of light passing through lens 36 is subject to a certain amount of refraction. The result of this refraction is the displacement of the point of light focused by lens 36 so that it is no longer aligned with the remaining portion of the "line" of light. From the previous explanation of the operation of this embodiment of my invention it will be evident that such displacement distorts the results obtained from the apparatus. To offset this refractive displacement, glass plate 38 is attached to partition 42 such that the remaining portion of the "line" of light that does not pass through lens 36 passes through plate 38. Plate 38 is of such density and thickness that the displacement of the remaining portion of the "line" of light due to refraction as it passes through the plate is equal to the displacement due to refraction of the point of light. Thus, are the two components of the "line" of light once more re-aligned.

I claim:

1. A device for reproducing visual records which includes means for forming a line of light at a surface on which is placed the visual record to be reproduced, means cooperating with said first named means for moving said line across said surface in a direction transverse to the base line of said visual record while the longitudinal dimension of said line of light extends generally in the direction of said base line of said visual record, a first light sensitive device having an output signal responsive to the intensity of light in the field of vision of said first light sensitive device, means cooperating with said first light sensitive device restricting the field of vision thereof to a narrow path intercepting said line and extending across said surface in the direction of movement of said line, a second light sensitive device having an output signal responsive to the intensity of light in the field of vision of said second light sensitive device, means cooperating with said second light sensitive device to restrict the field of vision thereof to a path intercepting said line and extending across said surface in the direction of movement of said line, an output circuit to which the output signals of said first and second light sensitive devices are connected as input signals and having an output signal responsive to a difference in the output signals of said first and second light sensitive devices.

2. The apparatus of claim 1 in which said line of light is limited in its length.

3. The apparatus of claim 1 in which the path to which the field of vision of said first light sensitive device is restricted is adjacent to the path to which the field of vision of said second light sensitive device is restricted.

4. The apparatus of claim 1 in which said output circuit includes a gate circuit connected to said first light sensitive device to pass said output signal thereof and including a control circuit having the output signal of said second light sensitive device connected as an input to said control circuit to close said gate circuit upon a change in said output signal of said second light sensitive device corresponding to a decrease in light intensity in the field of vision of said second light sensitive device.

5. A scanning device for sequentially scanning a surface which includes a scanning head for sequentially scanning a linear spot of light in a path transverse to the longitudinal dimension of said spot of light across said surface through a series of positions incrementally displaced along said surface in the direction of the longitudinal dimension of said spot, a first light sensitive device having a field of vision including the path of said spot and a minor portion of the longitudinal dimension of said spot, said first light sensitive device having an output signal responsive to the intensity of light in said field of vision of said first light sensitive device, a second light sensitive device having a field of vision including the path of said spot and a major portion of the longitudinal dimension of said spot, said second light sensitive device having an output signal responsive to the intensity of light in said field of vision of said second light sensitive device, a first gate circuit connected to said first light sensitive device to pass said output signal thereof and including a control circuit having the output signal of said second light sensitive device connected as an input to said control circuit to close said gate circuit upon a change in said output signal of said second light sensitive device corresponding to a decrease in light intensity in the field of vision of said second light sensitive device.

References Cited in the file of this patent

UNITED STATES PATENTS

| | | |
|---|---|---|
| 2,936,886 | Harmon | May 17, 1960 |
| 2,945,956 | Frank | July 19, 1960 |
| 2,968,793 | Bellamy | Jan. 17, 1961 |